United States Patent
Serles et al.

(10) Patent No.: US 10,694,113 B1
(45) Date of Patent: Jun. 23, 2020

(54) DARK FIELD ILLUMINATION FOR LASER BEAM DELIVERY SYSTEM

(71) Applicant: Xiris Automation Inc., Burlington (CA)

(72) Inventors: Cameron Serles, Oakville (CA); Vladimir Chpakovski, Mississauga (CA)

(73) Assignee: XIRIS AUTOMATION INC., Burlington (CA)

( * ) Notice: Subject to any disclaimer, the term of this patent is extended or adjusted under 35 U.S.C. 154(b) by 0 days.

(21) Appl. No.: 16/401,100

(22) Filed: May 1, 2019

(51) Int. Cl.
*H04N 5/235* (2006.01)
*H04N 5/225* (2006.01)
*G02B 5/22* (2006.01)
*G02B 27/14* (2006.01)
*B23K 26/03* (2006.01)

(52) U.S. Cl.
CPC ......... *H04N 5/2354* (2013.01); *B23K 26/032* (2013.01); *G02B 5/22* (2013.01); *G02B 27/14* (2013.01); *H04N 5/2253* (2013.01)

(58) Field of Classification Search
CPC .. H04N 5/2354; H04N 5/2253; B23K 26/032; G02B 27/14; G02B 5/22
See application file for complete search history.

(56) References Cited

U.S. PATENT DOCUMENTS

| | | | | |
|---|---|---|---|---|
| 2002/0088952 | A1* | 7/2002 | Rao | G01N 21/9501 250/559.45 |
| 2004/0012775 | A1* | 1/2004 | Kinney | G01N 21/9501 356/237.2 |
| 2004/0207836 | A1* | 10/2004 | Chhibber | G01N 21/4738 356/237.4 |
| 2010/0283835 | A1* | 11/2010 | Bewersdorf | G02B 21/0076 348/47 |
| 2015/0338248 | A1* | 11/2015 | Kalelkar | G01D 5/268 73/862.624 |
| 2018/0186082 | A1* | 7/2018 | Randhawa | B29C 64/135 |

* cited by examiner

*Primary Examiner* — Anner N Holder
(74) *Attorney, Agent, or Firm* — Steven M. Greenberg, Esq.; Shutts & Bowen LLP (57) ABSTRACT

Systems and methods for observing a substrate, and laser operations thereon, are described. Dark field illumination is directed through a camera port of a laser beam delivery system and through laser beam delivery system optics of the laser beam delivery system onto the substrate. Simultaneously, a high dynamic range (HDR) camera system to observe light reflected from the substrate and transmitted through the laser beam delivery system optics of the laser beam delivery system to the camera port of the laser beam delivery system. The wavelengths of a pilot laser of the laser beam delivery system reaching the lensing system of the HDR camera system may be attenuated in intensity and may be confined to a peripheral, off-axis optical path.

2 Claims, 6 Drawing Sheets

DARK FIELD ILLUMINATION FOR LASER BEAM DELIVERY SYSTEM

TECHNICAL FIELD

The present disclosure relates to laser beam delivery systems such as laser welders and laser cutters, and more particularly to camera systems for observing delivery of laser beams to a substrate by such laser beam delivery systems.

BACKGROUND

Infrared lasers are used in various industrial applications to perform operations on substrates such as metal. Such operations include cutting a monolithic substrate into two or more pieces, or welding a substrate consisting of multiple pieces together.

The design of most laser beam delivery systems used in such industrial applications provides for the delivery of a powerful infrared laser beam to a target point on the substrate with precise focus and position. In addition, a pilot laser, which typically emits light in a range visible to the human eye and at an intensity that does not affect the substrate, is usually integrated into the laser beam delivery system as an indicator for the operator as to where the infrared laser will appear on the substrate. The pilot laser, in general, is a red laser with a wavelength range in the visible spectrum between 620 nm to 690 nm.

The main infrared laser beam enters the laser beam delivery system from a laser fiber cable via a beam delivery connector and is projected onto a target point by the laser beam delivery system optics, that is, the internal optics of the laser beam delivery system. The laser beam delivery system optics typically include a combination of specialized optical mirrors, lenses, filters and other optical devices that provide a focused, directed light beam of a specific wavelength. Typically the laser beam delivery system is designed to suit the type of welding to be performed. The same connector is also used for delivery of the pilot laser source through the laser beam delivery system optics.

On many laser beam delivery systems, a video camera port is included to allow for the optical coupling of a video camera to the system to allow the operator to visually observe the setup of the welding process (including material alignment and location) prior to activating the laser that will operate on the substrate. In such systems, the laser beam delivery system optics, that is, the internal optics of the laser beam delivery system, are configured, typically by way of a beam splitter, to direct light reflected from the substrate to the camera port. The camera port may take the form of a transparent window in a housing of the laser beam delivery system.

Typically, conventional video cameras are coupled to the camera port of a laser beam delivery system. They provide an adequate image of the work area through the laser beam delivery system optics prior to activating the laser that will operate on the substrate, and allows use of the pilot laser for initial positioning. However, once the operating laser is activated, it provides too much illumination and conventional video cameras become saturated with light, seriously inhibiting their ability to monitor operations on the substrate. Stated another way, because conventional video cameras have a low dynamic range, they cannot be effectively used during infrared laser welding or cutting processes as the image is too bright for the camera.

It is also known to use high dynamic range (HDR) cameras in welding operations. The term "dynamic range" refers to the ratio between the largest and smallest values that a signal (e.g. a light signal) may assume, and in base-10 is measured in decibel (dB). The term "high dynamic range" or "HDR", as used herein, means an imaging capability of a dynamic range of at least 140 dB. Specialized HDR camera systems for welding operations include those offered by Xiris Automation Inc. having an address at 1016 Sutton Drive, Unit C5, Burlington, Ontario, Canada L7L 6B8. HDR cameras offer a good image when the operating laser (e.g. the infrared laser used to operate on the substrate) is active.

Thus, a logical solution for the problem of light saturation of conventional video cameras during infrared welding operations would seem to be replacement of the conventional video camera with an HDR video camera to be able to see the laser spot and substrate during operation of the infrared laser. Unfortunately, this merely substitutes one problem for another. While an HDR video camera provides very good imaging when the operating laser is active, when the operating laser is not active, there is insufficient light for the HDR video camera to effectively resolve the work surface.

One option that has been explored in an effort to resolve this latter problem is to use a co-axial illuminator in conjunction with an HDR video camera to illuminate the work surface with enough light to be seen by the HDR camera through the laser beam delivery system optics. In reality, however, because the optical components and specialized optical coatings of the laser beam delivery system optics are optimized for the delivery of the powerful operating infrared laser beam, there is substantial back reflection or "ghosting" in the optical path that results from the co-axial illumination light and from the pilot laser. This ghosting appears in the view seen by the HDR video camera, substantially impeding its effectiveness.

Thus, one was left with the dichotomous choice of either effectively observing the substrate before activation of the operating laser, or during the welding or cutting operation, but not both.

SUMMARY

The present disclosure describes a combination of an HDR video camera and a dark field illuminator configured so that dark field illumination can be delivered through the camera port, via the laser beam delivery system optics, to a substrate while the HDR video camera simultaneously observes the substrate through the camera port.

In one aspect, an illuminated camera system comprises a dark field illuminator, a high dynamic range (HDR) camera system comprising an HDR video camera and a lensing system, a beam splitter, and a support mounting that carries the dark field illuminator, the HDR camera system and the beam splitter. The beam splitter is optically interposed between the dark field illuminator and the HDR camera system. The dark field illuminator, the HDR camera system and the beam splitter are arranged relative to one another so that the dark field illuminator and the HDR camera share a common field of view. When the illuminated camera system is arranged so that the common field of view is in registration with a camera port on a laser beam delivery system having laser beam delivery system optics and positioned to deliver a laser beam over a substrate, light from the dark field illuminator is transmitted through the beam splitter, through the common field of view, through the camera port and through the laser beam delivery system optics to the substrate, and reflected light from the substrate is transmitted through the laser beam delivery system optics, through the camera port, through the common field of view, and reflected from the beam splitter to the HDR camera system.

In some embodiments, the HDR camera system further comprises an attenuating filter optically interposed between the beam splitter and the lensing system of the HDR camera system. The attenuating filter is substantially completely transparent to wavelengths of at least one light source of the dark field illuminator and transmissive to wavelengths of a pilot laser of the laser beam delivery system, but is substantially less transmissive to the wavelengths of the pilot laser than to the wavelengths of the at least one light source of the dark field illuminator. In such embodiments, the HDR camera system may further comprise a path-defining filter optically interposed between the beam splitter and the lensing system of the HDR camera system. The path-defining filter is substantially completely opaque to the wavelengths of the pilot laser, and is shaped to provide a peripheral off-axis optical path between the beam splitter and the lensing system of the HDR camera system. The peripheral off-axis optical path bypasses the path-defining filter rather than passing through it.

In another aspect, a method for observing laser operations on a substrate comprises simultaneously directing dark field illumination through a camera port of a laser beam delivery system, whereby the dark field illumination is transmitted through laser beam delivery system optics of the laser beam delivery system onto the substrate, and using a high dynamic range (HDR) camera system to observe, through the camera port of the laser beam delivery system, light reflected from the substrate and transmitted through the laser beam delivery system optics of the laser beam delivery system to the camera port of the laser beam delivery system.

The method may comprise attenuating intensity of wavelengths of a pilot laser of the laser beam delivery system reaching a lensing system of the HDR camera system, and may further comprise confining the wavelengths of the pilot laser of the laser beam delivery system reaching the lensing system of the HDR camera system to a peripheral, off-axis optical path.

BRIEF DESCRIPTION OF THE DRAWINGS

These and other features will become more apparent from the following description in which reference is made to the appended drawings wherein.

DETAILED DESCRIPTION

Broadly speaking, the present disclosure describes a system and method in which dark field illumination is applied to the substrate to be operated on so that the material can be imaged by an HDR video camera during the alignment procedure using the pilot laser, with minimal "ghosting" reflection from the laser beam delivery system optics. The HDR video camera can also observe the substrate during operation of the main infrared laser.

Figure 1:
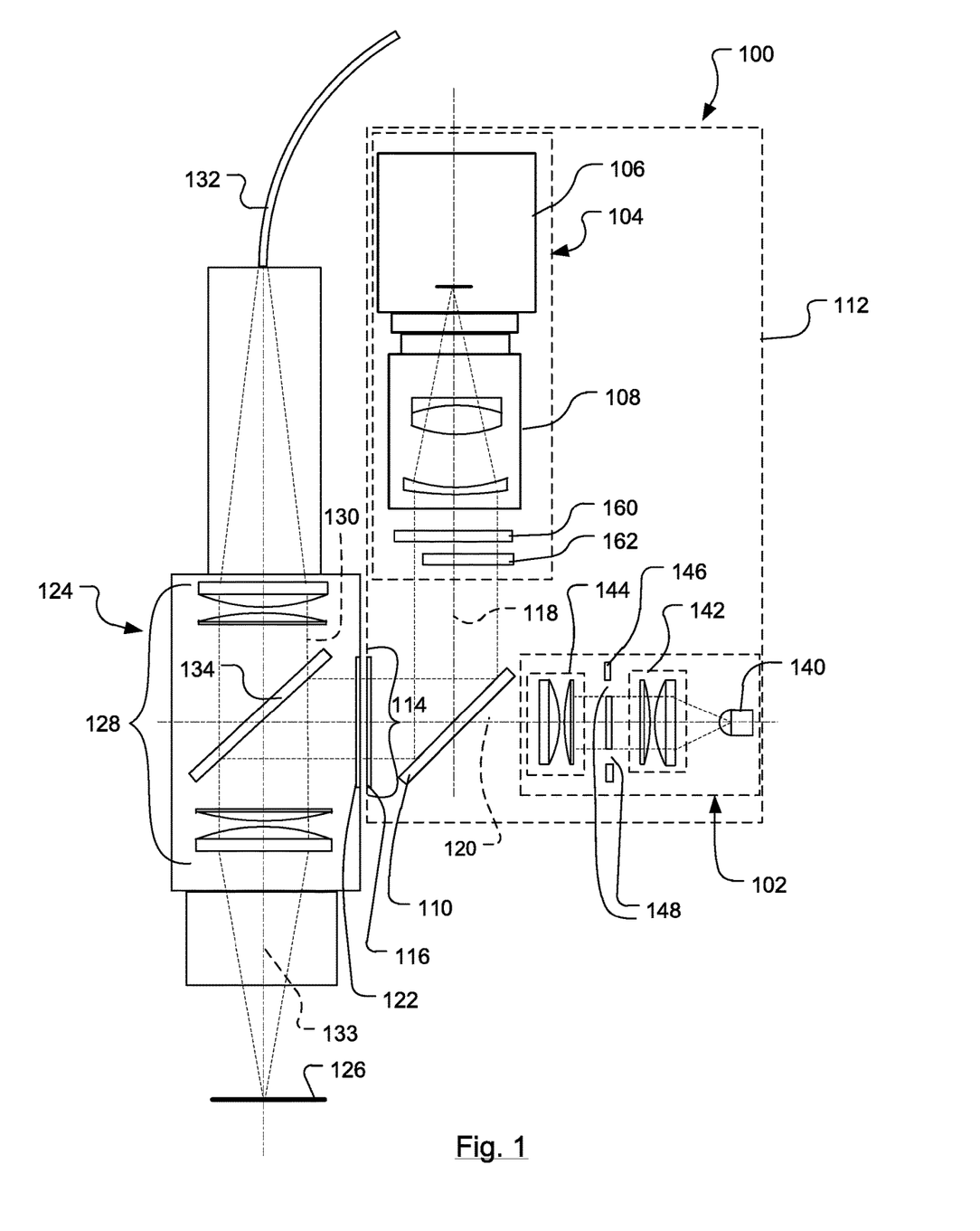
FIG. 1 is a schematic representation of an illustrative illuminated camera system according to an aspect of the present disclosure.

Reference is now made to FIG. 1, which shows an illustrative implementation of an illuminated camera system, indicated generally by reference 100, according to an aspect of the present disclosure.

The illuminated camera system 100 comprises a dark field illuminator 102, a high dynamic range (HDR) camera system 104 comprising an HDR video camera 106 and a lensing system 108, and a beam splitter 110. The HDR video camera 106 and lensing system 108 are shown schematically for illustrative purposes and are not intended to be limiting; e.g. a wide range of suitable lensing systems and HDR video cameras may be used. A support mounting 112 carries the dark field illuminator 102, the HDR camera system 104 and the beam splitter 110, which is optically interposed between the dark field illuminator 102 and the HDR camera system 104.

The dark field illuminator 102, the HDR camera system 104 and the beam splitter 110 are arranged relative to one another so that the dark field illuminator 102 and the HDR camera system 104 share a common field of view 114. Preferably, the support mounting 112 comprises a substantially opaque enclosure that includes a window 116 positioned in registration with the common field of view 114. In the illustrated embodiment, the respective optical axes 118, 120 of the HDR camera system 104 and the dark field illuminator 102 are arranged substantially normal to one another, and share the common field of view 114 by way of direct passage through the beam splitter 110 for the dark field illuminator 102 and by way of reflection off of the beam splitter 110 for the HDR camera system 104. The substantially normal relative arrangement of the dark field illuminator 102 and the HDR camera system 104 within a substantially opaque enclosure is merely one illustrative embodiment and is not intended to be limiting; other configurations are also contemplated.

Where, as in the illustrated embodiment, the support mounting 112 comprises a substantially opaque enclosure that includes a window 116 positioned in registration with the common field of view 114, the illuminated camera system 100 may be positioned with the window 116, and hence the common field of view 114, in registration with a conventional camera port 122 of a laser beam delivery system 124, which may be positioned to deliver a laser beam onto a target substrate 126. Although not shown, one skilled in the art will appreciate that the position of the HDR camera system 104, relative to the beam splitter 110, can be adjusted linearly (i.e. perpendicular to the optical axis 118) and by axial displacement (i.e. longitudinal displacement along the optical axis 118 of the HDR camera system 104).

The laser beam delivery system 124 may be of conventional design and may be, for example, a laser welder or a laser cutter. The laser beam delivery system 124 has laser beam delivery system optics 128 which form a main optical channel 130 of the laser beam delivery system 124. The laser beam delivery system optics 128 will typically comprise a sophisticated multi-element optical design incorporating special optical coatings for the main operation laser beam (typically a powerful infrared (IR) laser beam), which is delivered by an optical fiber 132, through the main optical channel 130 formed by the laser beam delivery system optics 128, to the surface of the target substrate 126. In addition to the main operation laser beam, the laser beam delivery system 124 will typically also be provided with a pilot laser, which is projected co-axially, as a narrow beam, through the main optical channel 130 to provide provides a precise indication of the focus point on the surface of the target substrate 126 where the main operation laser will be projected. The pilot laser is typically a red laser in the visible spectrum, with a wavelength range from about 620 nm to 690 nm. As can be seen, the laser beam delivery system optics 128 may include a laser system beam splitter 134 so that the surface of the target substrate 126 is reflected through the camera port 122. Examples of commercially available laser beam delivery systems include those offered by HIGHYAG Lasertechnologie GmbH, having an address at Hermann-von-Helmholtz-Str. 2, 14532 Kleinmachnow, Germany, those offered by Laser Mechanisms, Inc. having an address at 25325 Regency Drive, Novi, Mich. 48375, U.S.A., those offered by Precitec, Inc., having an address at 28043 Center Oaks Ct., Wixom, Mich. 48393 U.S.A., those offered by TRUMPF GmbH+Co. KG having an address at Johann-Maus-Strasse 2, 71254 Ditzingen, Germany, those offered by Laserline GmbH, having an address at Fraunhofer Straße, 56218 Mülheim-Kärlich, Germany and those offered by Rofin-Sinar Laser GmbH, having an address at Berzeliusstraße 87, 22113 Hamburg, Germany.

Figure 1A:
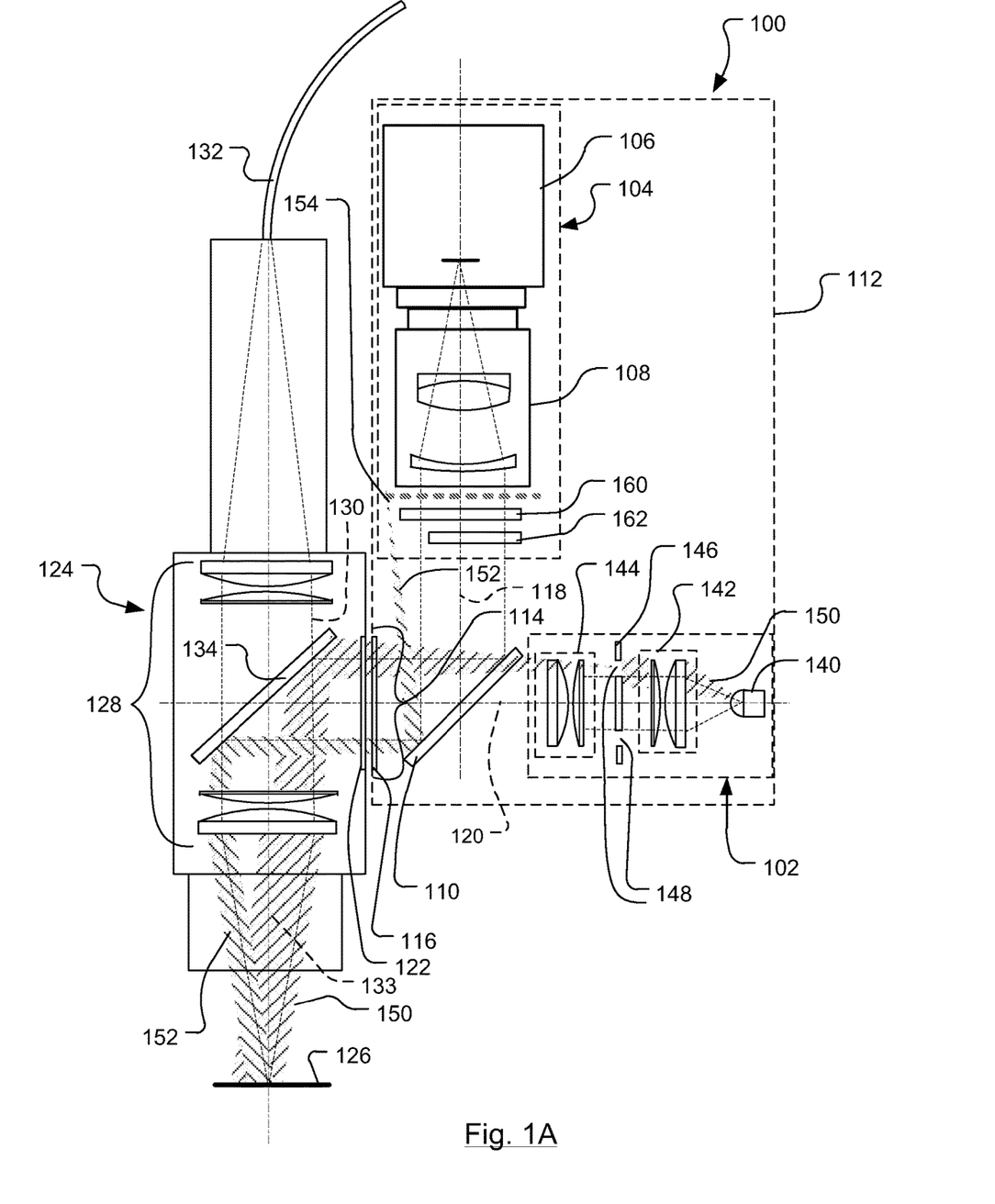
FIG. 1A is a schematic representation of the illuminated camera system of FIG. 1, showing light paths from a dark field illuminator thereof to an HDR camera thereof.
Figure 1B:
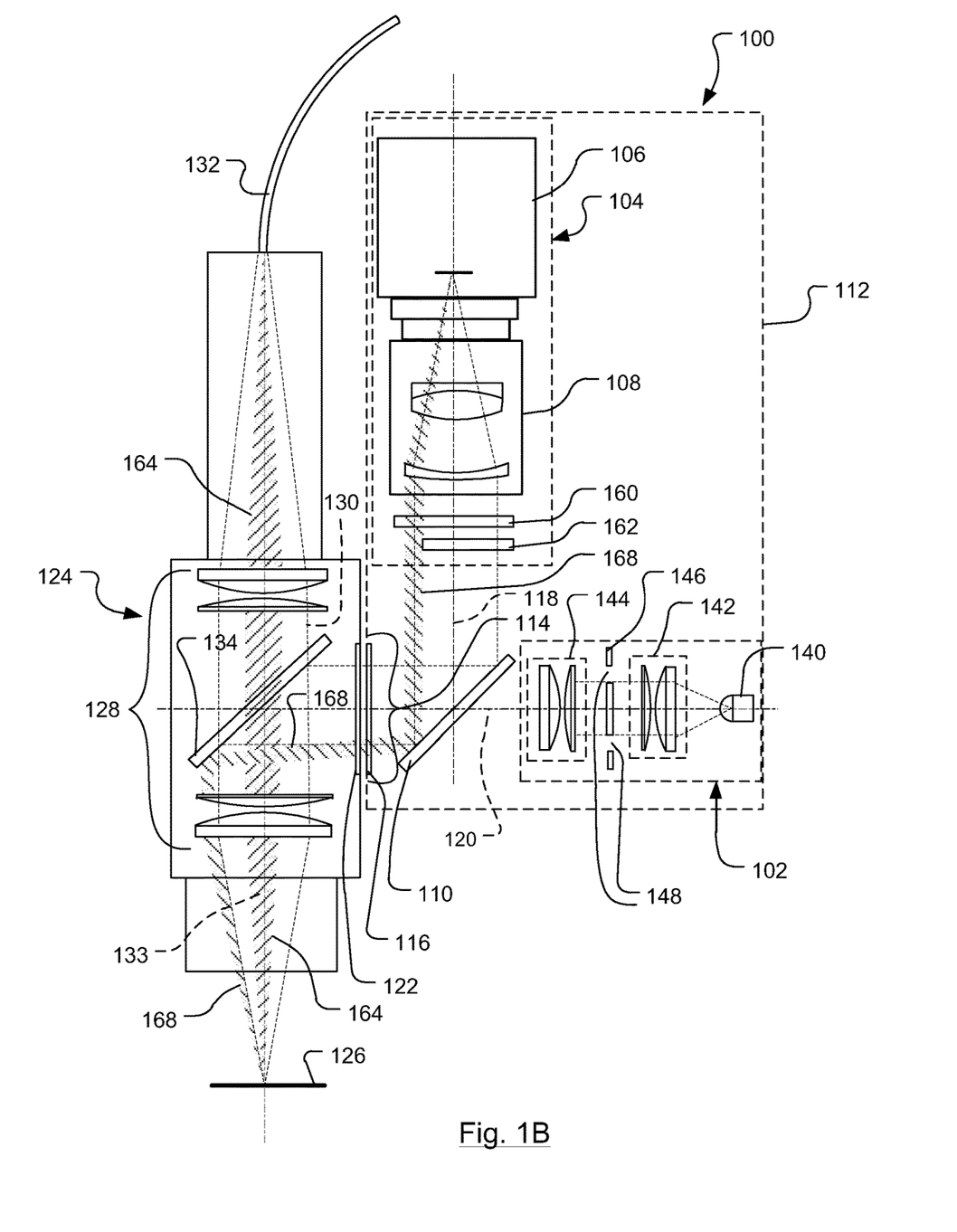
FIG. 1B is a schematic representation of the illuminated camera system of FIG. 1, showing light paths from a pilot laser of a laser beam delivery system to the HDR camera of the illuminated camera system of FIG. 1.
Figure 3:
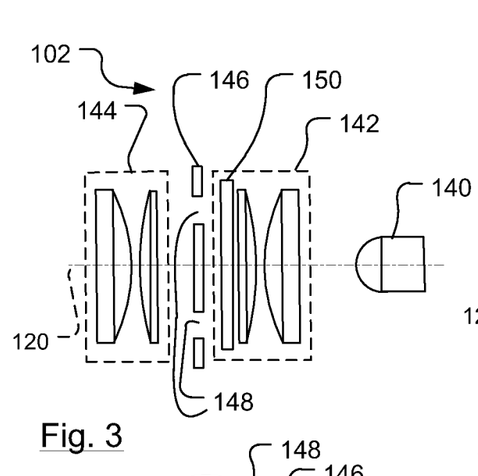
FIG. 3 is a schematic representation of an illustrative dark field illuminator of the illuminated camera system of FIG. 1.
Figure 4:
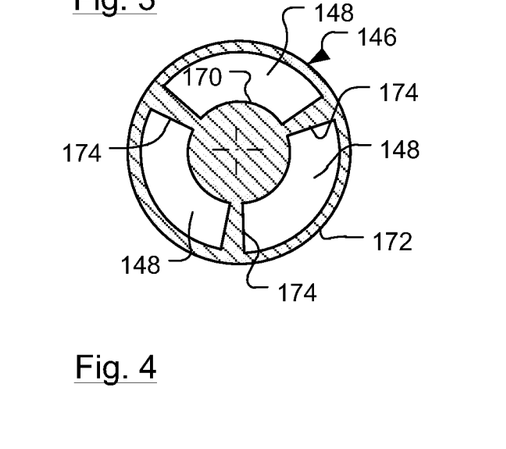
FIG. 4 is a schematic representation of an opaque diaphragm for the dark field illuminator of the illuminated camera system of FIG. 1.

In the illustrated embodiment shown in FIGS. 1 to 1B, the dark-field illuminator 102 comprises at least one light source 140, a first condenser 142, a second condenser 144, and an opaque diaphragm 146 having off-axis optical apertures 148 (see FIGS. 3 and 4). The first condenser 142 may include a diffuser 150 (see FIG. 3). The light source(s) 140 may be, for example, one or more light-emitting diodes (LEDs), such as a single LED or a ring of LEDs, or a light source incorporating an optical fiber, or another suitable light source (or sources). In one embodiment, the light source(s) 140 emit a specific narrow band light in the blue or green range of the visible spectrum, for example from about 450 nm to about 570 nm. The specific blue or green wavelength range for the light source(s) may be selected in consideration of the internal optical components and coatings that exist within the laser beam delivery system optics 128 so as to provide high transmittance through the main optical channel 130 of the laser beam delivery system 124 while limiting "ghosting" reflections from inner optical surfaces. Certain illustrative implementations of particular embodiments of the dark-field illuminator 102 will be described in detail further below, with reference to FIGS. 3 to 4D.

Referring now to FIG. 1A, the light source(s) 140 emit light 150 (shown with hatched lines as a sectional projection from a point, for ease of illustration) toward the first condenser 142. The first condenser 142 projects the light 150 toward the opaque diaphragm 146, where a portion of the light 150 passes through the off-axis optical apertures 148 while the remainder is obstructed. Then, the second condenser 144 projects the light 150 which has passed through the opaque diaphragm 146 and therefore images the opaque diaphragm 146 from a position plane thereof, through the beam splitter 110. The light 150 continues through the window 116, and hence the common field of view 114, through the camera port 122 of the laser beam delivery system 124 into the main optical channel 130 thereof, where it is reflected by the laser system beam splitter 134 onto the surface of the target substrate 126. The light 150 illuminates the surface of the target substrate 126, co-axially with the main optical channel 130, as a nearly collimated inclined beam.

The incident light 150 is directly reflected from the surface of the target substrate 126, as reflected light 152, into the main optical channel 130, where it is reflected by the laser system beam splitter 134 and projected back through the camera port 122 of the laser beam delivery system 124. The reflected light 152 continues through the window 116, and hence the common field of view 114, and is then reflected by the beam splitter 110 toward the HDR camera system 104, substantially co-axially therewith.

Thus, when the illuminated camera system 100 is arranged so that the common field of view 114 is in registration with the camera port 122 on a laser beam delivery system 124 having laser beam delivery system optics 128 and positioned to deliver a laser beam over a substrate 126, light 150 from the dark field illuminator 102 is transmitted through the beam splitter 110, through the common field of view 114, through the camera port 122 and through the laser beam delivery system optics 128 to the substrate 126, and reflected light 152 from the substrate 126 is transmitted through the laser beam delivery system optics 128, through the camera port 122, through the common field of view 114, and reflected from the beam splitter 110 to the HDR camera system 104.

The light 150 from the dark field illuminator 102 reaches the substrate 126 as an incident inclined beam 150, and the direct reflected beam of light 152 produces a conjugated diaphragm image 154 at the lensing system 108 after passing through a set of filters 160, 162 (described further below). Because the light 150 images the opaque diaphragm 146, the conjugated diaphragm image 154 at the lensing system 108 is a shadow image, masking severe direct "ghosting" reflections from the inner optical surfaces of the laser beam delivery system optics 128. The incident inclined beam 150 and then the direct reflected beam of light 152 do not form a real image at the lensing system 108; the conjugated diaphragm image 154 presented at the lensing system 108 represents a real image of the surface of the substrate 126 by way of reflections/shadows from the surface features of the substrate 126. The reflected light 152, in the form of the "ghost" reflection from the inner optical surfaces of the of the laser beam delivery system optics 128, is also inclined and does not form a real image at the lensing system 108.

Thus, the use of the dark field illuminator 102, rather than conventional illumination, allows the HDR camera system 104 to image the surface of the substrate 126 when the main operating laser is not operating while obviating "ghosting" effects.

While this approach is sufficient to obviate the "ghosting" effect resulting from conventional illumination through the camera port 122, preferred implementations according to the present disclosure also incorporate narrow bandwidth filters to compensate for "ghosting" in the optical path that results from the pilot laser, so that the HDR camera system 104 can also image the surface of the substrate 126 when the pilot laser is projected thereon. This is achieved by way of first and second narrow bandwidth filters 160, 162 interposed between the lensing system 108 and the beam splitter 110, which are now described with particular reference to FIG. 1B.

The first filter 160 is an attenuating filter 160, which is optically interposed between the beam splitter 110 and the lensing system 108 of the HDR camera system 104. The attenuating filter 160 has a transmission range of the spectrum optimized according to the specific range of the light source(s) 140 of the dark field illuminator 102, and also has a proportionally lower transmission range at the main wavelength of the pilot laser 164. Thus, the attenuating filter 160 is substantially completely transparent, that is, preferably at least 90% transmissive, more preferably at least 92.5% transmissive, and most preferably at least 95% transmissive to the wavelengths of the light source(s) 140 of the dark field illuminator 102, and transmissive to wavelengths of the pilot laser 164 and its reflection 168 (shown with hatched lines in FIG. 1B) of the laser beam delivery system 124. However, the attenuating filter 160 is substantially less transmissive to the wavelengths of the pilot laser 164 (e.g. 620 nm to 690 nm) than to the wavelengths of the light source(s) 140 of the dark field illuminator 102. Preferably the attenuating filter 160 is at least 50% less transmissive, more preferably at least 60% less transmissive, still more preferably at least 70% less transmissive, yet still more preferably at least 80% less transmissive and even more preferably at least 90% less transmissive to the wavelengths of the pilot laser 164 than to the wavelengths of the light source(s) 140 of the dark field illuminator 102. One skilled in the art, now informed by the present disclosure, can select a difference in transmissivity based on a comparison of the relative intensities of the focal point from the pilot laser 164 to "ghosting" in the optical path.

The second filter 162 is a path-defining filter 162, which is also optically interposed between the beam splitter 110 and the lensing system 108 of the HDR camera system 104. The path-defining filter 162 filter also has a transmission range of the spectrum tuned, and preferably optimized, according to the specific range of the light source(s) 140 of the dark field illuminator 102, but substantially fully blocks/absorbs the main wavelength of the pilot laser 164 and its reflection 168 (e.g. absorption range within the visible spectrum between 620 nm to 690 nm). Thus, the path-defining filter 162 is at least transmissive, and preferably substantially transparent, to the wavelengths of the light source(s) 140 of the dark field illuminator 102, but is substantially completely opaque to the wavelengths of the pilot laser 164, and is shaped to provide a peripheral off-axis optical path 166 between the beam splitter 110 and the lensing system 108 of the HDR camera system 104. The peripheral off-axis optical path 166 bypasses the path-defining filter 162 rather than passing through it. Preferably, the path-defining filter 162 is at least 80% transmissive, more preferably at least 85% transmissive and still more preferably at least 90% transmissive to the wavelengths of the light source(s) 140 of the dark field illuminator 102, and at least 90% opaque, preferably at least 95% opaque and still more preferably at least 97% opaque wavelengths of the pilot laser 164.

The filters 160, 162 are selected and positioned, relative to one another and to the optical axis 118 of the HDR camera system 104, in such a way that the attenuating filter 160 is closest to the lensing system 108 of the HDR camera system 104 and covers the full aperture of the lensing system 108 of the HDR camera system 104, while the path-defining filter 162 is positioned in front of the attenuating filter 160 (i.e. closer to the beam splitter 110) and only partially covers the aperture of the lensing system 108. The peripheral off-axis optical path 166 is in registration with the portion of the lensing system 108 that is not covered by the path-defining filter 162.

Figure 2:
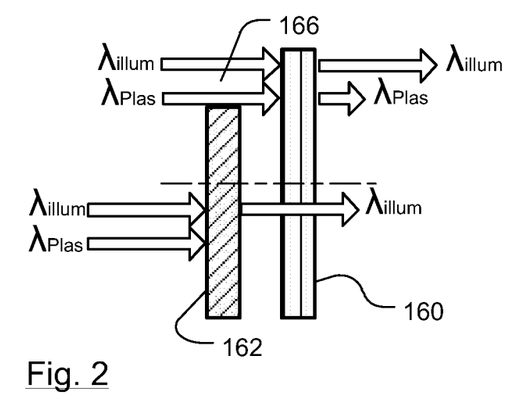
FIG. 2 is an isolated elevation view showing the relative positioning and function of an attenuating filter and a path-defining filter of the illuminated camera system of FIG. 1.
Figure 2A:
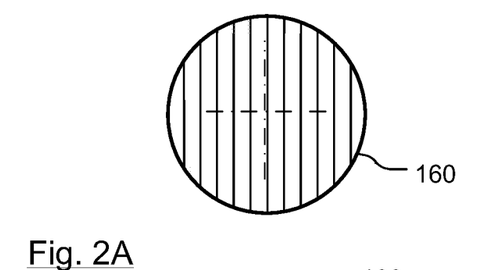
FIG. 2A shows a plan view of the attenuating filter of FIG. 2.
Figure 2B:
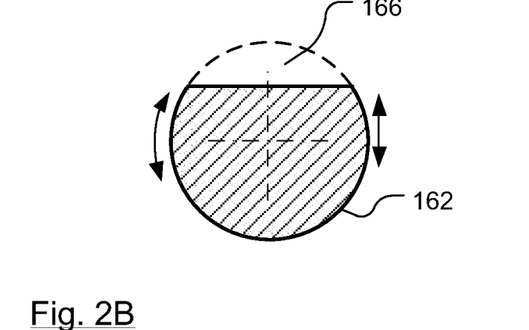
FIG. 2B shows a plan view of the path-defining filter of FIG. 2.
Figure 2C:
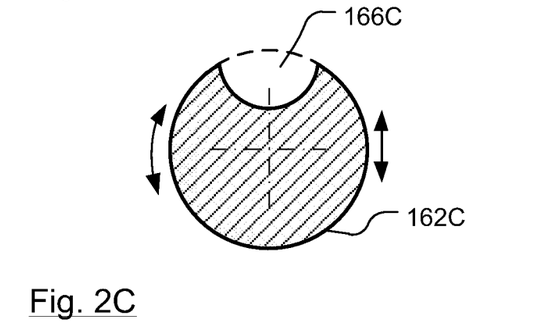
FIG. 2C shows a plan view of an alternate embodiment of a path-defining filter.

Reference is now made to FIG. 2, which shows the relative positioning of the illustrative filters 160, 162 in greater detail. A plan view of the illustrative attenuating filter 160, which is generally disk-shaped, is shown in FIG. 2A. A plan view of a first illustrative embodiment of the path-defining filter 162, which forms a major portion of a disk but with a segment cut away, is shown in FIG. 2B; the omitted segment (denoted by dashed lines) defines the peripheral off-axis optical path 166. FIG. 2C shows a plan view of a second illustrative embodiment of the path-defining filter 162C, which is similar to the first embodiment in that it forms a major portion of a disk, but has a parabolic portion rather than a segment cut away, with the omitted parabolic portion (denoted by dashed lines) defining the peripheral off-axis optical path 166C. The generalized disk and disk-like shapes of the filters 160, 162 are merely illustrative and are not intended to exclude other shapes. Likewise, the embodiments 162, 162C shown in FIGS. 2B and 2C are merely illustrative and not limiting, and other shapes and configurations for defining a peripheral off-axis optical path are also envisaged (for example, a de-centered aperture may be used instead of omitting an edge portion). In this sense, the term "peripheral off-axis" refers to a configuration in which the relevant path is not in registration with the optical axis 118 of the HDR camera system 104. Preferably, the path-defining filter 162, 162C can be adjusted linearly, i.e. perpendicularly to the optical axis 118, and by rotation about the optical axis 118, as shown by the arrows in FIGS. 2B and 2C.

Referring again to FIG. 1B, the path of the pilot laser 164 and its reflection 168 are shown with hatched lines. For clarity of illustration, the pathways of the "ghosting" reflections of the pilot laser 164 and its reflection 168 from the laser beam delivery system optics 128 are not shown.

As noted previously, the pilot laser 164 will typically be a red laser in the visible range of the spectrum, between about 620 nm and about 690 nm, and is emitted from the same optical fiber 132 as the main operation laser beam (typically a powerful infrared (IR) laser beam) and travels through the same main optical channel 130, along the optical axis 133 of the laser beam delivery system 124, to a focal point on the surface of the substrate 126. Thus, the pilot laser 164 will provide an indication of where the main operation laser beam will contact the surface of the substrate 126. The pilot laser 164 produces a direct reflection 168 from the surface of the substrate 126 back to the main optical channel 130 of the laser beam delivery system 124, where it is reflected by the laser system beam splitter 134 through the camera port 122. The reflected pilot laser 168 continues through the window 116, and hence the common field of view 114, and is then reflected by the beam splitter 110 toward the HDR camera system 104, substantially co-axially therewith 114. As the reflected pilot laser 168 traverses this path, the laser beam delivery system optics 128 produce a significant amount of "ghosting" reflections inside the optical pathway of the pilot laser 164 and its reflection 168.

The filters 160, 162 are selected and co-axially positioned, relative to one another and to the optical axis 118 of the HDR camera system 104, in such a way that only a portion of the reflected light 168 from the pilot laser 164 reaches the lensing system 108. Specifically, only that portion of the reflected light 168 from the pilot laser 164 that is in registration with the peripheral off-axis optical path 166 (i.e. where the lensing system 108 is not covered by the path-defining filter 162) reaches the lensing system 108. This arrangement allows the focal point from the pilot laser 164 on the surface of the substrate 126 to be imaged at the lensing system 108 of the HDR camera system 104, without a significant image of the "ghosting" reflection, while also permitting imaging of the surface of the substrate 126 while illuminated by the dark field illuminator 102, as well as imaging of a welding or cutting operation of the main operation laser on the surface of the substrate 126.

Returning to FIG. 2, because the path-defining filter 162 is at least transmissive, and preferably substantially transparent, to the wavelengths $\lambda_{illum}$ of the light source(s) 140 of the dark field illuminator 102, these wavelengths pass through the path-defining filter 162 to reach, and pass through, the attenuating filter 160, which is also transparent to the wavelengths $\lambda_{illum}$ of the light source(s) 140, to reach the lensing system 108. However, because the path-defining filter 162 is substantially completely opaque to the wavelengths $\lambda_{Plas}$ of the pilot laser 164, these wavelengths are blocked by the path-defining filter 162 except at the peripheral off-axis optical path 166, which allows the wavelengths $\lambda_{Plas}$ of the pilot laser 164 to bypass the path-defining filter 162 to reach the attenuating filter 160. The wavelengths $\lambda_{Plas}$ of the pilot laser 164 that reach the attenuating filter 160 are transmitted therethrough to reach the lensing system 108. However, because the attenuating filter 160 is substantially less transmissive to the wavelengths $\lambda_{Plas}$ of the pilot laser 164 and its reflection 168 than to the wavelengths $\lambda_{illum}$ of the light source(s) 140 of the dark field illuminator 102, the wavelengths $\lambda_{Plas}$ of the pilot laser 164 that reach the lensing system 108 do so with attenuated intensity (as shown by the smaller arrow for $\lambda_{Plas}$ on the right hand side of FIG. 2). Thus, the filters 160, 162 enable the reflection 168 from the pilot laser 164 through the main optical channel 130 to be partially projected onto the lensing system 108, via the peripheral off-axis optical path 166, to provide a balance between the contrast of the illuminated surface of the substrate 126 and the reduction of "ghosting" for the image of the pilot laser 164 from the laser beam delivery system optics 128. Moreover, the filters 160, 162 are also transmissive, and preferably substantially transparent, to the visible wavelengths associated with welding or cutting operations by the main operation laser, typically from about 400 nm to about 590 nm, so that the HDR camera system 104 unit provides a high-quality, high-dynamic range image of the laser cutting or laser welding process (e.g. an image of the weld melting pool through the bright glare of the proximate plasma jet or arc created during the laser welding process).

While the Figures show the attenuating filter 160 disposed between the lensing system 108 and the path-defining filter 162, this is merely one illustrative embodiment. In other embodiments, the relative positions of the filters may be reversed, with the path-defining filter 162 disposed between the attenuating filter 160 and the lensing system 108.

While any suitable dark field illuminator may be used in association with the embodiments described herein, certain illustrative implementations of dark field illuminators will now be described, with reference to FIGS. 3 to 3D and 4 to 4D.

Reference is first made to FIGS. 3 and 4, which show in greater detail the illustrative dark field illuminator 102 shown in FIGS. 1 to 1B. This embodiment of a dark-field illuminator 102 comprises a single LED 140 as the light source 140, a first condenser 142 including a diffuser 150, a second condenser 144, and an opaque diaphragm 146 having off-axis optical apertures 148. The first condenser 142 is closer to the light source 140 than the second condenser 144. In this embodiment, the opaque diaphragm 146 comprises an opaque central disk 170 surrounded by an annular rim 172, with spokes 174 extending between the central disk 170 and the rim 172 so that the off-axis optical apertures 148 are defined between the central disk 170, the rim 172 and the spokes 174. The opaque diaphragm 146 is positioned strategically between the two condensers 142, 144, and the dark field illuminator 102 is positioned relative to the window 116 and camera port 122, in such a way that the light from the light source 140 is projected as substantially annular, axially symmetrical beam that ultimately produces a conjugated shadow image 154 on the lensing system 108, masking severe direct "ghosting" reflections from the laser beam delivery system optics 128.

Figure 3A:
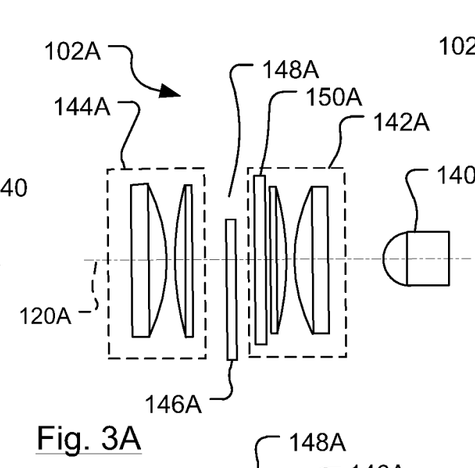
FIG. 3A is a schematic representation of a first alternative embodiment of a dark field illuminator.
Figure 4A:
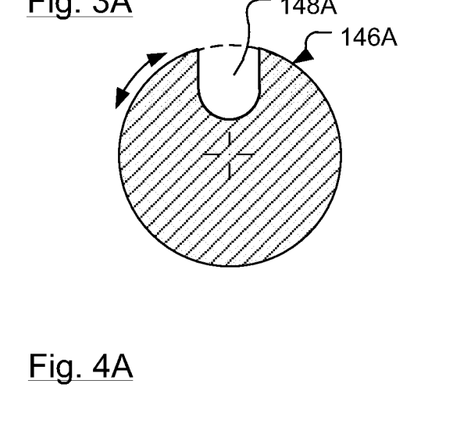
FIG. 4A is a schematic representation of an opaque diaphragm for the first alternative dark field illuminator of FIG. 3A.

Reference is now made to FIGS. 3A and 4A, which show a first alternate embodiment for a dark field illuminator 102A. The first alternate dark field illuminator 102A is similar to the illustrative dark field illuminator 102 described above, and like references refer to like features, but with the suffix "A". The first alternate dark field illuminator 102A differs from the illustrative dark field illuminator 102 described above in that the opaque diaphragm 146A comprises the major portion of a disk with a parabolic portion 148A cut away, with the omitted parabolic portion 148A (denoted by dashed lines) defining the off-axis optical aperture 148A. The opaque diaphragm 146A can be axially rotated to adjust the position of the off-axis optical aperture 148A, as shown by the arrows, and is positioned strategically between the two condensers 142A, 144A so that when the dark field illuminator 102 is correctly positioned relative to the window 116 and camera port 122, the light from the light source 140A produces a conjugated shadow image 154 on the lensing system 108.

Figure 3B:
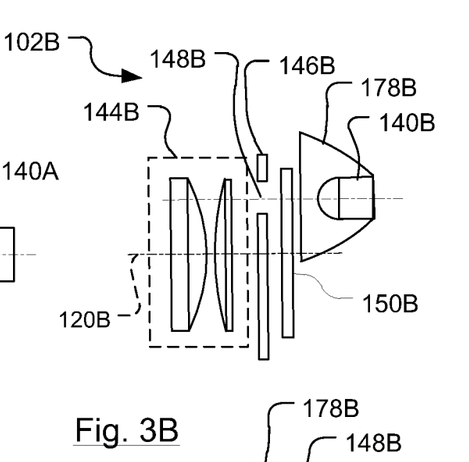
FIG. 3B is a schematic representation of a second alternative embodiment of a dark field illuminator.
Figure 4B:
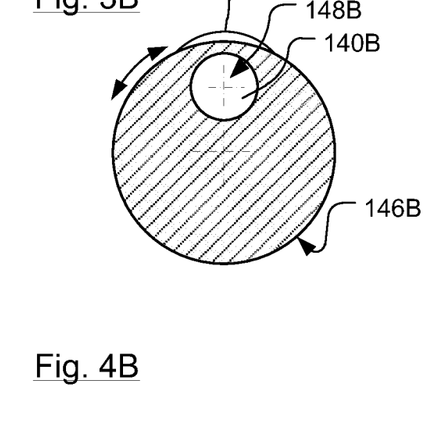
FIG. 4B is a schematic representation of an opaque diaphragm for the second alternative dark field illuminator of FIG. 3B.

Now referring to FIGS. 3B and 4B, a second alternate embodiment for a dark field illuminator 102B is described. The second alternate dark field illuminator 102B includes only a single condenser 144B. In the second alternate dark field illuminator 102B, the opaque diaphragm 146B comprises a disk with a non-concentric opening 148B formed therethrough; this non-concentric opening 148B is the off-axis optical aperture 148B. The light source 140B is arranged in registration with the non-concentric opening 148B, preferably coaxially therewith, and coupled with a reflector-concentrator 178B. The opaque diaphragm 146B can be axially rotated to adjust the position of the off-axis optical aperture 148A, as shown by the arrows, and the light source 140B and reflector-concentrator 178B are mechanically coupled to the opaque diaphragm 146B so as to orbit the rotational axis thereof to maintain registration with the non-concentric opening 148B. A diffuser 150B is disposed between the light source 140B and the non-concentric opening 148B, and the opaque diaphragm 146B is disposed between the diffuser 150B and the condenser 144B. This arrangement is also configured to produce a conjugated shadow image 154 on the lensing system 108.

Figures 3C, 4C:
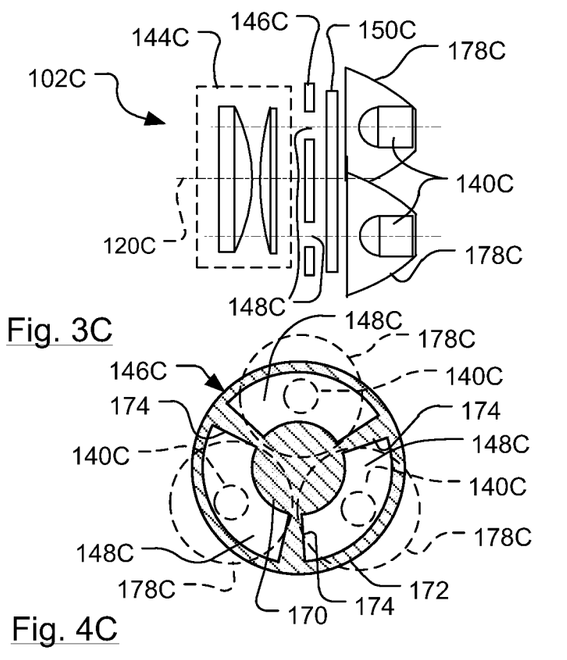
FIG. 3C is a schematic representation of a third alternative embodiment of a dark field illuminator.
FIG. 4C is a schematic representation of an opaque diaphragm for the third alternative dark field illuminator of FIG. 3C.

FIGS. 3C and 4C show a third alternate embodiment for a dark field illuminator 102C. The third alternate dark field illuminator 102C includes only a single condenser 144C, with an opaque diaphragm 146C similar to the opaque diaphragm 146 of the illustrative dark field illuminator 102 shown in FIGS. 3 and 4. Instead of a single LED as the light source, the third alternate dark field illuminator 102C has a ring of LEDs 140C, each coupled with a respective reflector-concentrator 178C and arranged in registration with respective ones of the off-axis optical apertures 148C defined between the central disk 170C, the rim 172C and the spokes 174C of the opaque diaphragm 146C. A diffuser 150C is disposed between the light source 140C and the opaque diaphragm 146C. The light from the light sources 140C will produce a conjugated shadow image 154 on the lensing system 108 when suitably positioned.

Figure 3D:
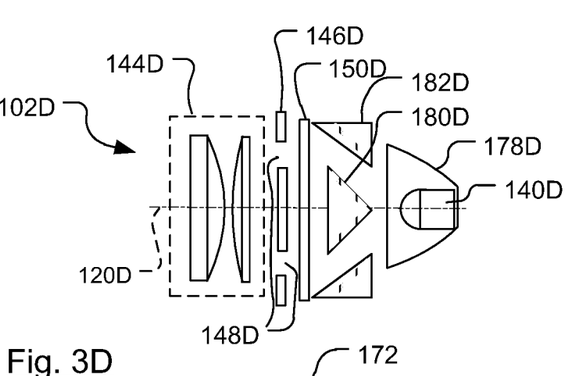
FIG. 3D is a schematic representation of a fourth alternative embodiment of a dark field illuminator.
Figure 4D:
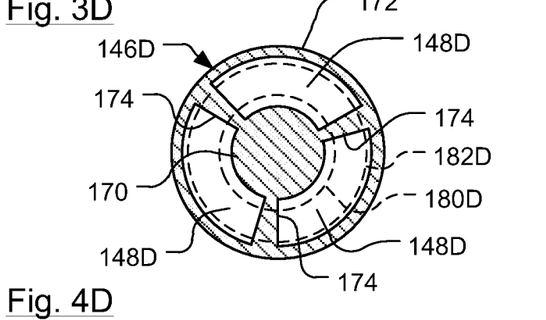
FIG. 4D is a schematic representation of an opaque diaphragm for the fourth alternative dark field illuminator of FIG. 3D.

With reference now to FIGS. 3D and 4D, a fourth alternate embodiment for a dark field illuminator is indicated generally at reference 102D. The fourth alternate dark field illuminator 102D is similar to the illustrative dark field illuminator 102 described above, with like references referring to like features but with the suffix "D". However, the fourth alternate dark field illuminator 102D has a pair of opposed concentric conical mirrors, namely an inner mirror 180D and an outer mirror 182D. The light source 140D is single LED 140, which is coupled with a reflector-concentrator 178D, and the LED 140D, reflector-concentrator 178D, inner mirror 180D and an outer mirror 182D are configured so that light emitted by the LED 140D is formed by the mirrors 180D, 182D into an annular beam. Like the other embodiments for dark field illuminators described herein, this arrangement is also configured to produce a conjugated shadow image 154 on the lensing system 108.

For each of the above-described illustrative dark field illuminators 102, 102A, 102B, 102C, 102D, the light emitted from the light source(s) 140, 140A, 140B, 140C, 140D, projected towards the operational surface of the substrate 126, travels around the central portion of the opaque diaphragm 148, 148A, 148B, 148C, 148D and the optical axis 120, 120A, 120B, 120C, 120D of the dark-field illuminator 102, 102A, 102B, 102C, 102D, and then, in general, travels parallel to the optical axis 133 of the main optical channel 130 of the laser beam delivery system 124 (see FIG. 1A).

While the above-described embodiments for dark field illuminators contemplate opaque diaphragms in which the entire diaphragm is formed from an opaque material and the off-axis optical aperture(s) are formed by physical gaps in the opaque material, it is also contemplated that the opaque diaphragms may comprise transmissive or transparent materials with opaque coatings, with the off-axis optical aperture (s) formed by gaps in the opaque coating. More generally, the dark field illuminators 102, 102A, 102B, 102C, 102D and the opaque diaphragms 148, 148A, 148B, 148C, 148D are merely illustrative and are not intended to exclude other configurations, shapes or arrangements.

Thus, as illustrated in FIG. 1A, the present disclosure enables a method for observing laser operations on a substrate 126. This method comprises directing dark field illumination 152 through a camera port 122 of a laser beam delivery system 124, whereby the dark field illumination 154 is transmitted through laser beam delivery system optics 128 of the laser beam delivery system onto the substrate 126 and simultaneously using an HDR camera system 104 to observe, through the camera port 122 of the laser beam delivery system 124, light (including the dark field illumination 152) reflected from the substrate 126 and transmitted through the laser beam delivery system optics 128 of the laser beam delivery system 124 to the camera port 122 of the laser beam delivery system 124.

As shown in FIG. 1B, the method may further comprise attenuating intensity of wavelengths of a pilot laser 164 of the laser beam delivery system 124 reaching a lensing system 108 of the HDR camera system 104, and may yet further comprise confining the wavelengths of the pilot laser 164 of the laser beam delivery system 124 reaching the lensing system 108 of the HDR camera system to a peripheral, off-axis optical path 166.

The optical parameters for the optical components of the illuminated camera system 100 should be designed to be compatible with the laser beam delivery system optics 128 of the laser beam delivery system 124, and one skilled in the art, now informed by the present disclosure, can select appropriate parameters. Magnification and other conventional optical features may also be included within the embodiments described herein; these are within the capability of one skilled in the art, now informed by the present disclosure, and hence are not described further.

Certain currently preferred embodiments have been described by way of example. It will be apparent to persons skilled in the art that a number of variations and modifications can be made without departing from the scope of the claims.

What is claimed is:

1. An illuminated camera system, comprising:
   a dark field illuminator;
   a high dynamic range (HDR) camera system comprising an HDR video camera and a lensing system;
   a beam splitter optically interposed between the dark field illuminator and the HDR camera system; and
   a support mounting that carries the dark field illuminator, the HDR camera system and the beam splitter;
   the dark field illuminator, the HDR camera system and the beam splitter being arranged relative to one another so that the dark field illuminator and the HDR camera share a common field of view;
   whereby, when the illuminated camera system is arranged so that the common field of view is in registration with a camera port on a laser beam delivery system having laser beam delivery system optics and positioned to deliver a laser beam over a substrate:
      light from the dark field illuminator is transmitted through the beam splitter, through the common field of view, through the camera port and through the laser beam delivery system optics to the substrate; and
      reflected light from the substrate is transmitted through the laser beam delivery system optics, through the camera port, through the common field of view, and reflected from the beam splitter to the HDR camera system;
   wherein the HDR camera system further comprises:
   an attenuating filter optically interposed between the beam splitter and the lensing system of the HDR camera system, wherein the attenuating filter is:
   substantially completely transparent to wavelengths of at least one light source of the dark field illuminator; and transmissive to wavelengths of a pilot laser of the laser beam delivery system; but substantially less transmissive to the wavelengths of the pilot laser than to the wavelengths of the at least one light source of the dark field illuminator;

wherein the HDR camera system further comprises:

a path-defining filter optically interposed between the beam splitter and the lensing system of the HDR camera system, wherein the path-defining filter is:

substantially completely opaque to the wavelengths of the pilot laser; and shaped to provide a peripheral off-axis optical path between the beam splitter and the lensing system of the HDR camera system wherein the peripheral off-axis optical path bypasses the path-defining filter rather than passing through it.

2. A method for observing laser operations on a substrate, the method comprising:

simultaneously:

directing dark field illumination through a camera port of a laser beam delivery system, whereby the dark field illumination is transmitted through laser beam delivery system optics of the laser beam delivery system onto the substrate; and using a high dynamic range (HDR) camera system to observe, through the camera port of the laser beam delivery system, light reflected from the substrate and transmitted through the laser beam delivery system optics of the laser beam delivery system to the camera port of the laser beam delivery system;

further comprising:

attenuating intensity of wavelengths of a pilot laser of the laser beam delivery system reaching a lensing system of the HDR camera system; and confining the wavelengths of the pilot laser of the laser beam delivery system reaching the lensing system of the HDR camera system to a peripheral, off-axis optical path.

* * * * *